(12) United States Patent
Kirchertz (10) Patent No.: US 9,581,476 B2
(45) Date of Patent: Feb. 28, 2017

(54) METHOD AND MEASURING DEVICE FOR VOLUME MEASUREMENT AND EVALUATION

(75) Inventor: Jorg Kirchertz, Iserlohn (DE)

(73) Assignee: VSE Volumentechnik GmbH (DE)

( * ) Notice: Subject to any disclaimer, the term of this patent is extended or adjusted under 35 U.S.C. 154(b) by 763 days.

(21) Appl. No.: 13/885,857

(22) PCT Filed: Nov. 8, 2011

(86) PCT No.: PCT/EP2011/069674
§ 371 (c)(1),
(2), (4) Date: Jul. 31, 2013

(87) PCT Pub. No.: WO2012/065883
PCT Pub. Date: May 24, 2012

(65) Prior Publication Data
US 2014/0144249 A1 May 29, 2014

(30) Foreign Application Priority Data

Nov. 19, 2010 (DE) .................. 20 2010 015 598 U (51) Int. Cl.
*H03F 1/26* (2006.01)
*G01F 15/06* (2006.01)
(Continued)

(52) U.S. Cl.
CPC ............. *G01F 1/56* (2013.01); *G01D 5/24414* (2013.01); *G01F 3/10* (2013.01)

(58) Field of Classification Search
CPC .......... G01F 1/08; G01F 1/12; G01F 25/0007; G01F 1/56; G01F 3/10; G01D 5/24414
(Continued)

(56) References Cited

U.S. PATENT DOCUMENTS 5,586,045 A * 12/1996 Box .......................... G01F 3/10
702/100
6,535,830 B2   3/2003 Ruesch et al.
(Continued)

FOREIGN PATENT DOCUMENTS

DE   197 03 243   7/1998
EP   0 853 231    7/1998
(Continued)

*Primary Examiner* — An Do
(74) *Attorney, Agent, or Firm* — Salter & Michaelson (57) ABSTRACT

The invention relates to a method for measuring the volumetric flow (Q) of a fluid in a preferred direction by means of a volume measurement device having an electronic circuit and an incremental encoder, a sensor for detecting a rotational change of angle, preferably designed as two giant magnetoresistance (GMR) sensors in a double measuring bridge, wherein a first sinusoidal signal of the incremental encoder, namely a raw sine signal (S1), and a second sinusoidal signal of the incremental encoder with identical angular frequency ω which is phase-shifted by 90° relative to the first signal (S1), namely a raw cosine signal (S1), are generated, wherein said signals (S1) are preferably initially conditioned (S1+), interpolated/digitized (S2), and said digital signals (S2) are processed and evaluated in an evaluation unit, preferably in a process computer unit having a quadrature encoder counter. The invention further relates to a method for measuring a volumetric flow by means of a quadrature signal, comprising a first signal from a first sensor and a second signal from a second sensor having identical angular frequency ω which are phase-shifted by 90° relative to one another, wherein the quadrature signal serves to determine the flow (Q) of a fluid in a preferred direction by a volume measurement device having an electronic circuit. The invention further relates to a volume measurement device for carrying out a measurement method and to a programmable process computer unit having at least (Continued)

one quadrature encoder interface/quadrature encoder encounter for use in a volume measurement device for measuring a volumetric flow.

18 Claims, 4 Drawing Sheets

(51) Int. Cl.
*G01F 1/56* (2006.01)
*G01D 5/244* (2006.01)
*G01F 3/10* (2006.01)

(58) Field of Classification Search
USPC .............. 702/50, 54, 55, 127, 189, 190; 73/861.77–861.79
See application file for complete search history.

(56) References Cited

U.S. PATENT DOCUMENTS

| | | |
|---|---|---|
| 7,650,800 B2 | 1/2010 | Ertler |
| 2002/0035441 A1 | 3/2002 | Ruesch et al. |

FOREIGN PATENT DOCUMENTS

| | | |
|---|---|---|
| JP | 55-127213 | 9/1980 |
| JP | 2008-501940 | 1/2008 |
| WO | 2005 119185 | 12/2005 |
| WO | 2006 131134 | 12/2006 |

\* cited by examiner

METHOD AND MEASURING DEVICE FOR VOLUME MEASUREMENT AND EVALUATION

TECHNICAL FIELD

The invention relates to a method for measuring a volumetric flow of a fluid in a preferred direction by a means of a volume measurement device having an electronic circuit and an incremental encoder, a sensor for detecting a rotational change of angle, preferably designed as two giant magnetoresistance (GMR) sensors in a double measuring bridge, wherein a first sinusoidal signal of the incremental encoder, namely a raw sine signal, and a second sinusoidal signal of the incremental encoder with identical angular frequency $\omega$ which is phase-shifted by 90° relative to the first signal, namely a raw cosine signal, [are generated]*, wherein these signals are preferably first conditioned, interpolated/digitized, and these digital signals are processed and evaluated in an evaluation unit, preferably in a process computer unit having a quadrature encoder counter.

*Text in brackets is added for clarity. —Translator's note.

Further, the invention relates to a method for measuring a volumetric flow by means of a quadrature signal, comprising a first signal of a first sensor and a second signal of a second sensor having identical angular frequency $\omega$, which are phase-shifted by 90° relative to one another, wherein the quadrature signal serves to determine the through-flow or flow of a fluid in a preferred direction by means of a volume measurement device having an electronic circuit, as well as a volume measurement device for conducting a measurement method and a programmable process computer unit having at least one quadrature encoder interface/quadrature encoder counter for use in a volume measurement device for measuring a volumetric flow.

BACKGROUND OF THE INVENTION

Measurements of liquid quantities and their flow velocities are covered in a large field of fluid and process engineering by through-flow or volumetric measurement systems that operate according to the positive displacement principle.

In these measurement systems, the requirements particularly for measurement precision and dynamic range are very high in the respective processes.

These processes particularly involve those processes in which a control, monitoring or testing must be conducted with maximum speed and precision.

In addition, a plurality of processes (e.g., liquids having different physical properties) are conducted, often with the same unit, which in turn places high requirements for the bandwidth of the operational capability of the entire system.

The invention shall meet the above-named requirements to the greatest extent. For this, first the functional interplay between the mechanical and the electronic components fitting most precisely in the through-flow or volumetric measurement system must be selected. After this, the design of the electronic unit is most important: it must be designed correspondingly as technically more efficient, more powerful, and more flexible. The entire measurement system as well as the method belonging to it and the corresponding arrangement shall be more intelligent, more robust and more user-friendly than the solutions known previously in the prior art.

As the basis for a higher efficiency, a higher resolution is necessary, which can be already produced by WO 2005/119 185 A1. In this case, a flow rate sensor has a measurement chamber, into which a medium whose volume and/or flow velocity will be measured can be introduced and can again be discharged. Freely rotatable mounted operating elements for measurement are found in the measurement chamber. Over and above this, at least one sensor is provided for the measurement of magnetic fields and/or changes of magnetic fields, and also a circuit means is provided, into which the output signals of the one or more sensors will be introduced. The one or more sensors provide an output signal and introduce it to the circuit means. The initial signal fluctuates periodically between a minimum value and a maximum value for each passage of an individual tooth and tooth gap belonging thereto of one of the measurement operating elements. Depending on the position of the tooth relative to the one or more sensors, the output signal assumes a reproducible intermediate value. The circuit means is constructed in such a way that it forms its own output signals from the output signals of the one or more sensors, and the circuit output signals convert the intermediate values into countable values that are representative of the partial volumes for the volumes transported between two teeth.

Positive displacement counters are rigidly clamped in the liquid column and any movement in the fluid circuit is recognized in this way. This is a very great advantage for the dynamics of the measurement system.

System oscillations may occur, however. Such oscillations may occur both in flow rest phases or also in the operating flow during flow phases. These oscillations are also recorded, adversely affecting the precision of the entire system. Consequently, during the measurement, pulses are also generated from the measurement system that are erroneously interpreted by electronic evaluations. This "negative" sensitivity in this case is increased still further by an increase in resolution or an interpolation factor. In each case depending on the intensity of the oscillations, error signals can be generated in the form of single-channel pulses or pulse sequences in the direction of through flow (preferred direction) or in the direction opposite to this operating direction.

Problematic in the measurement and evaluation systems and methods known previously in the prior art is the difficulty of exact measurement, taking into consideration possible system oscillations as well as disruptive and difficult process conditions, or the like.

Disruptive and difficult process conditions include, for example, the previously discussed fluctuations in the liquid column in the fluid system during flow rest phases, discontinuous flows with fluctuations in the direction opposite to the flow direction, a large flow bandwidth having high resolution requirements along with processing limits of the evaluation units, as well as increased demands for precision.

In further detail, the following undesired phenomena to be avoided as well as their causes are, in particular:

When clocked system components are present in the fluid circuit, such as, e.g., servo valves with dithers, or vibrations are present in system parts, such as, for example, a piston pump in free cycle, fluctuations of the liquid column arise in the fluid system during flow rest phases.

Discontinuous flows with fluctuations in the direction opposite to the flow direction arise, e.g., in process engineering in the case of a multi-component system, in which highly viscous adhesives or sealants are transported. Transport is conducted, e.g., by piston pumps that can also generate flows opposite to the preferred direction, due to their stroke movements, e.g., during the intake phase.

The physical properties of liquids are always dependent on ambient properties. Liquids practically adapt to their surroundings, whereby different physical phenomena result that are consequently of great importance correspondingly in the flow measurement.

Belonging to the variable physical properties under specific influences or process conditions are, in particular, the flow property, the fluidity (also called "inner friction"), the ratio of mass to volume of the liquid, the almost free displacement capability of the liquid molecules, friction between the liquid surfaces and the mechanical surfaces (also called "outer friction"), friction between the mechanical surfaces such as, e.g., bearings, changes in dimensions of the metal system components.

The process conditions are specified by the following factors:

Pressure in the fluid system, temperature of the fluid and of the environment, flow velocities, construction and material of the mechanical system components;

All of these physical factors in some way affect the precision in flow measurement technology, including positive displacement counters.

Said set of problems results from the requirement for increased precision. In many processes, the most highly precise measurements are demanded. The precision in the case of positive displacement counters will be influenced, in particular, by the liquid properties under the process-conditioned environment and the actual flow. The displaced volume changes slightly with the physical properties of the liquid under the respective conditions, such as pressure, temperature, and flow velocity, whereby deviations arise in the measurements.

For the most precise measurement requirements, the user must correspondingly adjust the pulse value of the output signals for the respective flow and the physical properties of the liquid in his evaluation. These parameters for the respective regions and corresponding to the physical properties of the liquid or the real displaced volume under the process conditions are normally taken up or filed in a reference table, a look-up table (abbrev.: LUT), this table being programmed in a downstream evaluation unit. With the values from the look-up table and a conversion algorithm, the evaluation of the corresponding pulse value is then conducted. This method, however, means a higher expenditure for the user, since for the most part the user needs to conduct a long startup procedure due to programming the parameters on his evaluation unit and in particular, needs to post-process the measurement results in a very time-consuming manner, which leads to a valuable loss of time and considerably more cost.

In particular, the measurement will have already been set in the measuring instrument, taking into consideration the above-named secondary physical conditions, and not set for the first time subsequently in a post-processing step.

Another problem is the desired high bandwidth of volumetric flows to be measured, i.e., a large flow bandwidth with high requirements for resolution along with processing limits of the evaluation units.

In several units, it may happen that the flow or volume measurement system needs to be operated over its entire volume or flow measurement range. Or, it may even be the case that different flow quantities or velocities must be run in one process or in several processes.

Additionally, however, the user would like to obtain as much information as possible of which of the interpolation methods described here can be produced due to the higher resolution. It can be a problem, however, to precisely set the correct interpolation factor. With high flow quantities or velocities, it may happen that the initial frequency for the downstream evaluation unit can no longer be processed. On the other hand, the resolution is for the most part too low for the user in the case of a smaller interpolation factor and small flow quantities or low velocities. For the most part, several system components, e.g. in the form of two switchable fluid circuits with displacement counters of different structural size, are used for solving this set of problems. Therefore, a possibility will be created so as to cover a broad bandwidth of different flow volumes with one measurement system.

The object of the present invention is to indicate a method for measuring a volumetric flow of a fluid in a preferred direction by means of a volume measurement device, which considers the above-named problems and permits, in particular, a user-friendly, time-saving and precise, as well as exact measurement.

Further, it is an object of the invention to indicate a method for measuring a volumetric flow by means of a quadrature signal, comprising a first signal of a first sensor and a second signal of a second sensor having identical angular frequency co, which are phase-shifted by 90° relative to one another, wherein the quadrature signal serves to determine the through-flow of a fluid in a preferred direction by means of a volume measurement device having an electronic circuit, by means of which the bandwidth of the measurement is increased, whereby measurement precision is further increased.

Another object of the invention is to indicate a volume measurement device for conducting a measurement method and a programmable process computer unit having at least one quadrature encoder interface/quadrature encoder counter for use in a volume measurement device for measuring a volumetric flow, which make possible a problem-free measurement of a volumetric flow.

SUMMARY OF THE INVENTION

These objects are achieved with a method for measuring a volumetric flow of a fluid in a preferred direction by means of a volume measurement device according to claim 1, a method for measuring a volumetric flow by means of a quadrature signal, comprising a first signal of a first sensor and a second signal of a second sensor having identical angular frequency co, which are phase-shifted by 90° relative to one another, wherein the quadrature signal serves to determine the through-flow of a fluid in a preferred direction by means of a volume measurement device having an electronic circuit, according to claim 6 as well as according to claim 8, and a volume measurement device for conducting a measurement method according to claim 10, as well as a programmable process computer unit having at least one quadrature encoder interface/quadrature encoder counter for use in a volume measurement device for measuring a volumetric flow according to claim 11. With this invention, the user is in a position to conduct explicit settings for the respective process conditions directly on the electronic unit. Therefore, he can prevent disruptive effects of the fluid system in his measurements, be more flexible in terms of applicability, and achieve an increased precision. An integrated signal processing electronic system having process computer units for signal control and for controlling quadrature output signals in displacement counter systems is provided by the invention. The invention particularly provides the following main features or improvements/novel features:

Digital signal filtering, interpolation factor with a teaching or learning function, as well as pulse value fitting.

The evaluation and processing within the method for measuring a volumetric flow of a fluid in a preferred direction by means of a volume measurement device having an electronic circuit and an incremental indicator, a sensor for detecting a rotational change of angle, preferably designed as two giant magnetoresistance (GMR) sensors in a double measuring bridge, wherein a first sinusoidal signal of the incremental encoder, namely a raw sine signal (S1), and a second sinusoidal signal of the incremental encoder having an identical angular frequency $\omega$, which is phase-shifted by 90° relative to the first signal (S1), namely a raw cosine signal (S1), [are generated]*, wherein these signals (S1) are preferably first conditioned (S1+), interpolated/digitized (S2), and these digital signals (S2) are processed and evaluated in an evaluation unit, preferably in a process computer unit having a quadrature encoder counter, which has the following steps:
a) Detecting the flow of the fluid;
b) Determining the direction of flow of the fluid;
c) Determining the state of flow of the fluid, i.e., flowing in the preferred direction, shivering and/or oscillating;
d) Further conducting the digital signals (S2) as a function of the state of the fluid to an output stage (110) in the form of a quadrature signal with pulse filtering (S3), namely:
in the case of flowing in the preferred direction: further conducting the original digital signal (S2);
in the case of shivering and/or oscillating: changing the digital signal (S2) to a base signal (no movement of the fluid) and further conducting the modified digital signal, which signals no flow (base signal).

*Text in brackets is added for clarity. —Translator's note.

The raw signal for the flow measurement is generated via a sensor having two GMR measuring bridges and a gear with a ferromagnetic component. The GMR measuring bridges are designed for a gear module or gear pitch corresponding to their distances relative to one another in the chip. The module or the tooth pitch or spacing of this "flywheel" is designed corresponding to the sensor. The magnetic field is supplied by a supporting magnet. The tooth structure of the flywheel now modulates the magnetic field of the supporting magnet on the individual GMR layers of the sensor by compressing or extending the magnetic field lines based on their change in direction. This modulated field strength is converted into a proportional electrical signal by means of the GMR effect in the measuring bridges. A sin/cos signal is generated in the measurement by means of the tooth structure. The same principle can also be implemented with a magnetized flywheel.

Oscillations in fluid systems are expressed by continual back- and forth-movements of the liquid column. Since displacement counters are completely clamped in the liquid column, these movements also act on their mechanical measuring mechanism. Continual rotational movements arise in both directions. The oscillations of the measuring mechanism are detected by the electronic sensing system and are transformed into pulse or edge sequences. By their properties, these sequences precisely reproduce the movement of the liquid column, i.e., the generated volume pulses are proportional to the displaced partial volumes. Thus, on the one hand, the oscillating liquid volume, and on the other hand, the different frequencies in the rotational movement of the mechanical measuring mechanism are measured. When it arises, each oscillation first produces a change in direction, i.e., the liquid remains for a short time and then sets the measuring mechanism in the displacement counter in rotation opposite to the preferred direction. There thus arises a brief "back run". The change in direction can be recognized in the generated quadrature signals (2 rectangular signals that are phase-shifted by 90°) of the interpolator. Two edges of one channel directly follow one another without any switching action of the other channel. In this way, the edge sequences or the 90° phase of both channels rotate. The subsequent switching actions of the two channels are dependent on the strength of the oscillation or on the measured partial volumes which are additionally still dependent on the set interpolation factor of the interpolator.

Either the edge sequences immediately rotate again, i.e., the next switching action is found in turn on the one channel, or pulse or edge sequences are generated in the opposite direction. The former situation arises with small oscillations, such as, e.g., "shivering" of the mechanical means or of the liquid column and/or an interpolation factor that is set low. Continual changes of direction are detected, i.e., switching actions are found only on one channel. The second case occurs rather in the case of oscillations with larger volumetric quantities of liquid or rotation paths and/or an interpolation factor that is set high. In this case, edges or pulse sequences are output in the opposite direction before the change in direction to the preferred direction or the movement/rotation to the initial position occurs again.

The signal filter function offers the user the possibility of filtering out edges or pulses during oscillation phases, so that the evaluation unit does not falsely interpret the error pulses. A process computer unit that has a quadrature encoder interface (QEI) and that is connected downstream to the interpolator takes over this function. The quadrature encoder interface provides a 4-fold evaluation, with which each edge change of the generated quadrature signals is recorded and counted. In addition, the interface provides information of counting direction, which also functions in an edge-controlled manner.

During operation, the process computer queries this directional identification after each edge change. If the flow measurement system is working in normal operation or in its preferred direction, then the states of the two output channels of the interpolator are forwarded directly to the signal outputs of the electronic system. In the case of an oscillation, signal filtering is activated. The states of the two channels are not forwarded to the outputs during the change in direction and are thus masked. The edge belonging thereto of the change in direction is counted by a forward-reverse counter of the quadrature encoder interface. The subsequent edges of the interpolator generated in the opposite direction are in turn masked and counted in the integrated counter. In fact, during the change back to the preferred direction, the state of the counter is decremented and the subsequent edges are again subtracted, up to the value of 0 in the counter (compensation of oscillation in the direction opposite to the preferred direction—back oscillation to the preferred direction) and thus also the initial position of the oscillation is again reached. Until this occurs, all switching actions of the two channels are not reproduced at the signal output circuit. The next edge changes of the channels in the preferred direction are then connected again to the signal outputs of the electronic system. This has the advantage for the user that, on the one hand, the pulses are masked during a back run, and, on the other hand, pulses are output again only after the oscillation or the rotation is returned again to its initial position. Therefore, neither too many nor too few edges are output or partial volumes measured (see FIG. 1).

The digital signal filtering can be adapted correspondingly as needed, so that undesired signals are filtered out, whereby the filtering rate can be adjusted.

Due to the fact that the determination of the state of the fluid is produced by comparing the time change of the first (S2) and/or the second signal (S2), namely:

State of flow in the preferred direction is present when, starting from a null position of the volume measurement device, the first signal (S2) is changed before the second signal (S2) (edge change), and a periodic change with this phase shift occurs;

State of shivering is present when one signal (S2) is constant and the other signal (S2) changes, and State of oscillation is present when, starting from a null position of the volume measurement device, the second signal (S2) is changed before the first signal (S2), and a periodic change with this phase shift occurs (backward oscillation), and subsequently (end of the backward oscillation), starting from a null position of the volume measurement device, the first signal (S2) is changed before the second signal (S2) and a periodic change with this phase shift occurs (forward oscillation);

the method can be refined, so that the precise identification of the undesired or required states can be determined.

If, after determining the state of oscillation or of shivering, first the volume of fluid that is transported opposite to the preferred direction during the oscillation or the shivering is equilibrated with the volume of fluid that is transported in the preferred direction (equilibration of counted pulses), before determining the state of flow in the preferred direction again occurs, the user will receive exact information on the effectively transported fluid volume.

In particular, for the measurement/detection and/or state determination, the edge changes of the signals are counted and/or processed in the evaluation unit, preferably of a process computer unit having a quadrature encoder counter, particularly preferably in an internal counter.

If the masked signals (S2) are output on another output and/or the same output, these signals (S2) preferably being signaled completely only starting from when they exceed a limit value, the user is in a position to set via switches a limit value or a limited number of edges for the counter, in order to finally establish flows in the opposite direction, if this is necessary.

An essential advantage of the invention is the further aspect of an interpolation fitting with a teaching function or also a learning function.

The interpolation of measurement signals serves here for increasing the resolution of measurement systems. In this case, the analog signals (raw signals of the sine and cosine) are divided into equal segments and digitized. The number of segments is called the interpolation rate. There are different interpolation methods. These include interpolation via the addition theorem, arc-tangent interpolation or nonius interpolation. The interpolation that is used in this development is based on the arc-tangent interpolation method.

In this method, the sine and cosine signals are constantly scanned and digitized via A/D transformers with sufficient bit resolution. The "angle information" or the "position" of the tooth under the GMR sensor can now be determined from these digital signals via the arc-tangent function. With consideration of the unit circle ($\sin^2+\cos^2=1$) and by calculating x=arctan (U sin/U cos), linear periodic partial regions result within an encoder period from which the A-B-Z pulse signals with the necessary rate are generated by means of corresponding digital switching points or threshold values.

The switching points are binary values proportional to the angle information that are determined by means of a look-up table (based on the bit width of the ADCs) or by means of a function algorithm. The Z signal is a signal that serves as a "reference mark" for the absolute angle measurement. It is generated once during an encoder period (mostly at 45°). This signal is not actually necessary for the flow measurement; however, it is used and interpreted here for the measurement of period duration for switching the interpolation factor and for recognizing the flow peak.

In the case of a method for measuring a volumetric flow by means of a quadrature signal, comprising a first signal of a first sensor and a second signal of a second sensor having identical angular frequency ω, which are phase-shifted by 90° relative to one another, wherein the quadrature signal serves to determine the through-flow of a fluid in a preferred direction by means of a volume measurement device having an electronic circuit, an interpolation factor, which is used for the resolution of the flow quantities of the fluid to be determined, is fitted as a function of the volumetric flow.

Preferably, the set and/or used interpolation factor is separately communicated, whereby different interpolation factors are preferably signaled via different voltage levels.

During operation, a process computer recognizes the time points of the switching via an independent frequency signal of the interpolator, the time points then being introduced by the latter.

The downstream evaluation units can recognize the different activations of the interpolation factors for the respective flow regions via a corresponding voltage level on the separate signal line. The following voltage levels are output: IPF1 at +0 V (e.g., GND); IPF2 at +2.25 V (e.g. $V_o$); IPF3 at +3.3 V (e.g. VDD); IPF4 at +5 V (e.g. VDDA).

With the teaching or learning function in relation to the interpolation factor, it is possible for the user to specify an interpolation factor explicitly for the respective flow region. The switching points for the interpolation factors in this case are indicated or learned once during startup and stored by the electronic system. In subsequent normal operation, the switching of the interpolation factors is carried out automatically. The status of the interpolation factor activation is transmitted to the connected evaluation unit via a separate signal line.

The user can precisely predict the switching between interpolation factors with the signal filter settings ("FILT") belonging thereto. The mode for the interpolation factor learning function is activated via setting coding switches, jumpers, and after pushing a button. The activation is signaled to the user via signaling devices (LEDs or the like) on the electronic system. After this, the user must set the number of flow regions with different interpolation factors on one of the coding switches and confirm this by pushing the button. In particular, 2 to 4 flow regions with corresponding interpolation factors can be set in a meaningful way.

After this, the user can stipulate the first interpolation factor and FILT belonging to it, even in the flow-free state of the unit, by setting the interpolation factor and FILT at the respective coding switches and pushing the button. The acquisition and the readiness for programming of the next interpolation factor is in turn signaled to him. After this, the user must set the flow at which the next interpolation factor will be activated. During this time, of course, the signals are active at the outputs in order to be able to correctly carry out the setting. If the corresponding flow is set, the user must set the next interpolation factor and FILT with the coding switches and effect storage in turn via the pushbutton.

In this setting method, preferably the independent frequency signal is first measured and analyzed by the electronics unit. Based on system components in the fluid circuits, such as, for example, pumps, the flows usually do not have a constant value, but they fluctuate around an average value.

During the analysis of the flow, the maximum values and minimum values of the flow rate thereof are determined. From these values, a switching hysteresis is established for the switching point that corresponds to the average value for the measured flow. An undesired, continual changing of the interpolation factors in the region of the switching point is thus avoided by means of this switching hysteresis.

An example: The change from a first interpolation factor IPF1 to the second interpolation factor IPF2 is only carried out when the flow lies in the region of the maximum value measured from the switching point. Whereby the switching from IPF2 to IPF1 is only effected if the flow rate lies in the region of the minimum value measured from the switching point during the learning phase.

This procedure is conducted at each switching point. After the last stored switching point, the electronic system signals the user that the configuration of the teaching function has terminated and has been activated. The teaching function can again be deactivated via changes at the jumpers.

Another possibility for programming the function of the interpolation factors is the complete input of parameters via the coding switches or via an electronic interface. In this setting method, the figures for the individual parameters, thus in particular, the number of interpolation factors IPF, the switching frequency, the interpolation factors IPF and the signal filter adjustments FIT, and the degree of hysteresis (in %) are programmed stepwise via the coding switches or an electronic interface.

This alternative setting method can be used, for example, when it is impossible for the user to execute the settings at the preamplifier during startup. In this case, he can simply actuate in advance the parameterization for switching the interpolation factors.

Another aspect is the pulse value fitting.

In the case of the method for measuring a volumetric flow by means of a quadrature signal, comprising a first signal of a first sensor and a second signal of a second sensor having identical angular frequency $\omega$, which are phase-shifted by 90° relative to one another, wherein the quadrature signal serves to determine the through-flow of a fluid in a preferred direction by means of a volume measurement device having an electronic circuit, a pulse value fitting of the quadrature signals is effected prior to further conduction to the output unit.

Figure 3:
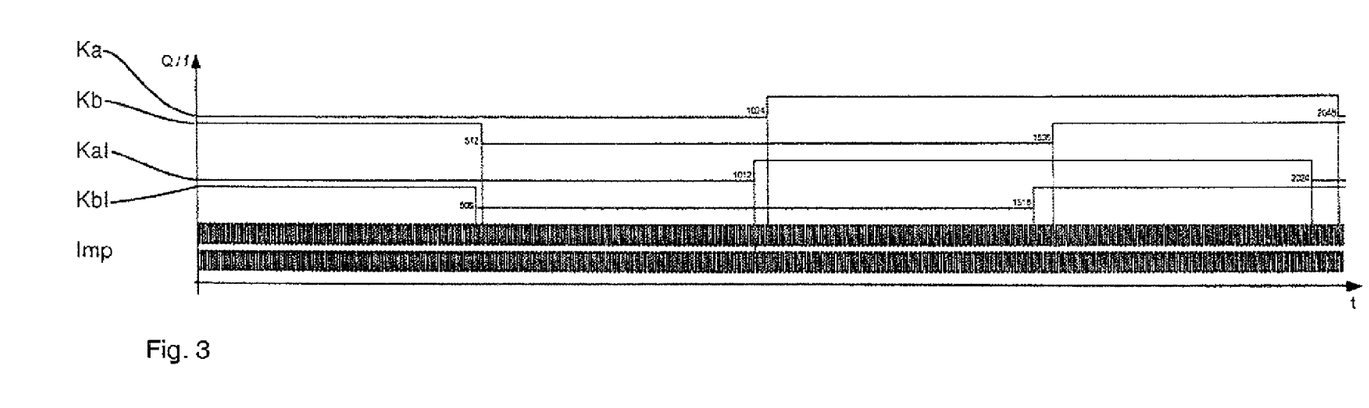
FIG. 3 an example of the pulse value fitting.

For this purpose, for the pulse value fitting to a database with predefined process values, preferably a look-up table is accessed and the correction values for the process conditions present at this time are read out and a correction of the quadrature signals is made by means of the correction values. Refer particularly to FIG. 3 for this.

The integrated function "pulse value fitting" of this electronic system now offers the user output pulses that directly provide the correct value or pulse length for the corresponding process condition. This fitting of the "frequency response" is also carried out in the electronic system by means of a look-up table and calculation algorithms. The electronics unit also requires corresponding parameters from the actually displaced volumes that prevail under the respective process conditions.

However, there is a large difference when compared to the method known in the prior art, in that this fitting or increase in precision is in fact carried out in the volume sensor electronic system and not for the first time in the evaluation unit, which the customer no longer needs to additionally program or acquire in a costly manner. This also offers the user an enormous potential for saving time.

There is now the possibility of allowing the parameters for the respective process conditions to be determined through an external site or by the manufacturer himself and to transfer them in the form of correction parameters into the memory of the electronic system. The user then receives an instrument that in fact provides the increased precision requirements for the corresponding measurement.

The greatest proportion of deviations occurs primarily due to the fluidity of the liquid, the flow rate, the pressure and the temperature, which are easy to reproduce.

In addition, the customer also has the possibility of determining the correction parameters himself on site under the process conditions at his plant (for example, by volume measurement on a balance) and transferring these parameters to the electronic system memory with the help of PC software and a special interface. If the user operates several evaluation units, he no longer needs to adapt these individually.

The hardware for the pulse value control is composed of a high-resolving interpolator and one or more process computer units. The latter are composed of two quadrature encoder counters (optionally also only one), a counter with a high bit width (for example, 32 bits) and a parent process computer for controlling the individual hardware components via interface communication (for example, SPI, I$^2$C, BISS, UART or CAN).

Above all, the measurement deviation under the respective process conditions must be established in use and documented by means of a measurement process with special and highly precise comparison instruments. These measurement deviations or the real measurement values must then be converted into correction values by calculations via commercial PC software or specially designed PC software and transferred to the memory of the electronic system.

In later operation, the electronic system first reads in the actual frequency or the flow value. This task is carried out with the help of the counter of high bit width. A high bit width is a prerequisite for frequency measurements over a large bandwidth. The measurement principle is based on the period duration or pulse width measurement method. For the period duration or pulse width measurement method, the pulse width from each individual pulse is measured and the frequency is calculated therefrom. The pulse width and thus the time duration of the pulse is measured by means of a high and constant clock frequency in this measurement method. Then the frequency is calculated from the reciprocal of the period duration. Since the period duration is measured with a clock frequency, e.g., of 40 MHz (which corresponds to a resolution of 0.025 sec), this measurement itself is still very precise in the case of high frequencies. Small frequency changes can also be detected immediately and continuously with this high resolution. Therefore, this measurement method is well suitable for precise frequency or flow and mass flow measurements. The signal to be evaluated is provided by the interpolator by means of the null signal (signal not interpolated). The corresponding correction value from the look-up table is now determined from this 32-bit value.

A certain number of correction values are listed in the look-up table, along with the frequencies or period durations (32-bit value) belonging to them. From these "support points", the corresponding correction values between the support points are calculated by means of interpolation calculations (here: approximation), i.e., a corresponding correction value can be determined from the support-point function for each periodically read-in frequency value from the 32-bit counter. This interpolation is produced either linearly, quadratically, or cubicly.

The correction values reproduce a corresponding number of edges, with which the actual pulse value fitting is carried out. The interpolator must be adjustable to a very high level such as, for example, 2048 edges per displaced volume increment. These highly interpolated signals are further conducted to the two quadrature encoder counters. These counters in turn operate in the 4-fold mode for edge evaluation and continually count in parallel the directionally-dependent edge sequences of the output signals.

At least two limit values in the form of specified edge counts can be programmed in each of the two quadrature encoder counters. Upon reaching the limit values, the two counters output corresponding pulse signals. These signals serve for switching between high and low to an output circuit. The limit values for the first quadrature encoder counter are normally: ±512 and ±1536, and the limit values for the second quadrature encoder counter are: ±1024 and ±2048(O).

It is obvious that here the four standard switching points within the non-interpolated signal period, or within a displaced volume increment are involved. With the correction values, one can now newly determine the corresponding limit values or switching points and thus explicitly change the pulse value or the frequency of the output signals.

The fitting will be explained below on the basis of an example. The input frequency amounts to 900 Hz, while the output frequency with pulse value fitting, in contrast, amounts to 910 Hz, this being reached by the correction value from −6 edges in positive direction. The following formulas are drawn on for the calculation:

$$T_{out} = \frac{1}{f_{out}} = \left[\left(\frac{1}{f_{in} \cdot 2048} \cdot (\text{correction value})\right) + \left(\frac{1}{f_{in} \cdot 4}\right)\right] \cdot 4$$

$$T_{out} = \frac{1}{f_{out}} = \left[\left(\frac{1}{900 \cdot 2048} \cdot (-6)\right) + \left(\frac{1}{900 \cdot 4}\right)\right] \cdot 4 = 1{,}098 \text{ ms}$$

$$f_{out} = \frac{1}{T_{out}} = 910 \text{ Hz}$$

*illegible – presumably 900·2048 and 900·4 – Translator's note.

**illegible – presumably 910 Hz – Translator's note.

The switching points or limit values of the channels are: 506 and 1518 edges as well as 1012 and 2024 edges (see FIG. 3). Both counters begin a new start of counting (counting state of 0) upon reaching their second limit value.

Further functions are an automatic sensor calibration function, a flow peak monitoring, an excess-temperature monitoring, an excess-frequency monitoring, as well as an error message in case of a sensor defect or break.

The volume measurement device for conducting a measurement method for volume determination has a programmable process computer, such as a microcontroller, an ASIC, an FPAG and/or a DSP having at least one quadrature encoder interface/quadrature encoder counter, whereby this arrangement conducts the evaluation of the measurement signals.

The unit of the programmable process computer unit having at least one quadrature encoder interface/quadrature encoder counter for use in a volume measurement device for measuring a volumetric flow on the hardware side is of special importance for conducting a volumetric flow measurement.

DESCRIPTION OF THE DRAWINGS

Additional advantageous configurations can be inferred from the figures. Examples of embodiment of the invention will be described below on the basis of the appended drawings.

Shown therein.

DETAILED DESCRIPTION

In addition, the same reference numbers are used for the same elements.

Figure 1:
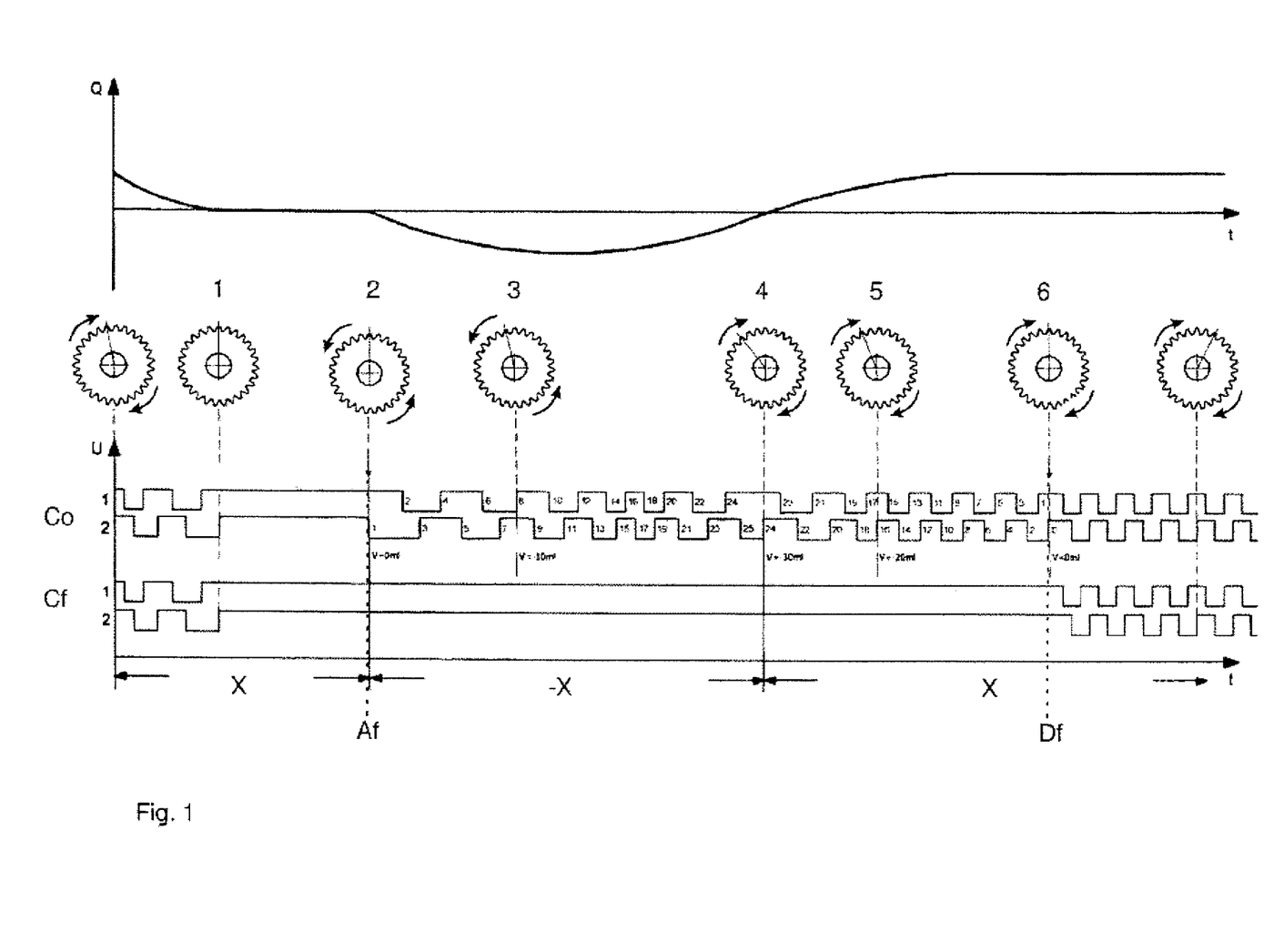
FIG. 1 an application example of the pulse filtering method based on a backward oscillation that is present.
Figure 2:
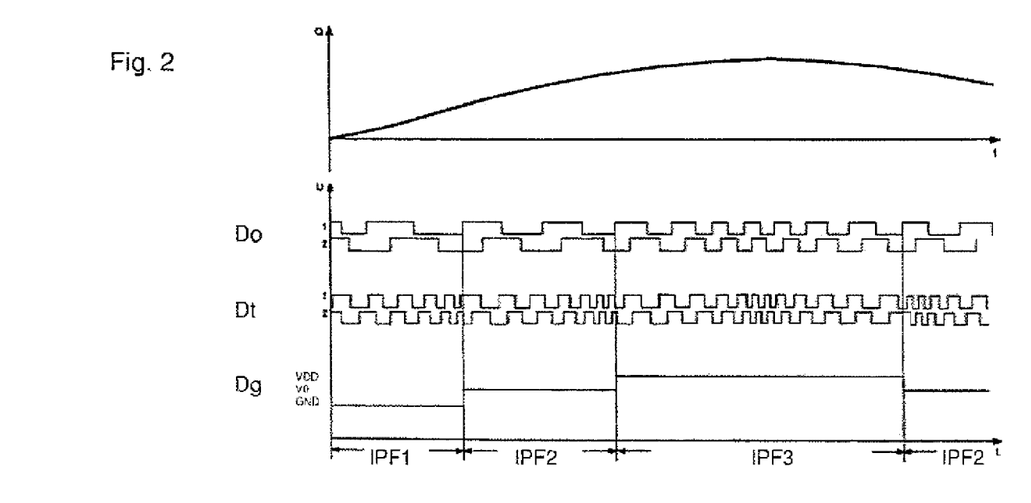
FIG. 2 an example of a fluid flow that may change over time, whereby a change of the interpolation factor results.

An application example of the pulse filtering method based on a backward oscillation that is present is shown in FIG. 1. The measurement volume amounts to 5 mL (4-fold; 1.25 mL per increment), The individual stages of the oscillation are shown in particular, i.e.:

1: Shutdown or stop
   Number of edges: 0
   Differential volume 0 mL
2: Beginning of oscillation and pulse filter activation; masking of the signal
   Number of edges: 0
   Differential volume 0 mL
3: Movement of the fluid opposite to the preferred direction
   Number of edges: 8
   Differential volume 10 mL
4: Change of oscillation to the preferred direction
   Number of edges: 24
   Differential volume 30 mL
5: Movement of the fluid in the preferred direction
   Number of edges: 16
   Differential volume 20 mL
6: Oscillation of the fluid and of the transported volume equilibrated; end of the pulse filtering; the signal is output again.
   Number of edges: 0
   Differential volume 0 mL An example of a fluid flow Q that is variable over time t, whereby a change of the interpolation factor IPF results, is shown in FIG. 2.

The different interpolation factors, namely IPF1, IPF2 as well as IPF3, are identifiable here and can thus be correlated with the corresponding flow quantities Q in liters per min.

A fitting of sensitivity results.

The signaling of the accompanying IPFs is communicated over a separate line (voltage).

FIG. 3 shows an example of the pulse value fitting. The example named above is drawn on again and shown graphically in this representation.

The resolution of the imported pulse signals IMP amounts to 2048 edges.

Figure 4:
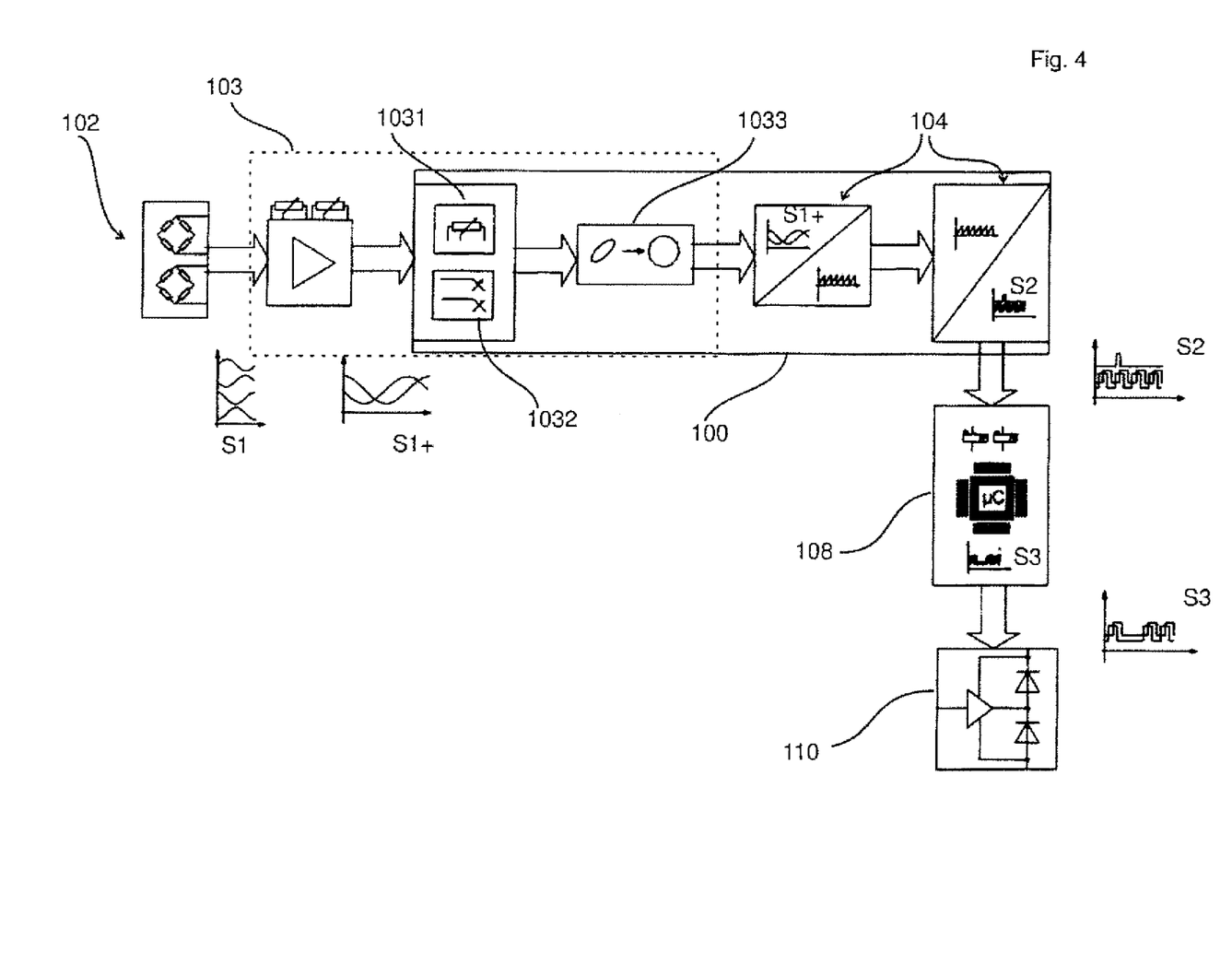
FIG. 4 an exemplary signal processing, in particular for the function of pulse filtering as well as interpolation factor function.

An exemplary signal processing, in particular for the functions of pulse filtering as well as interpolation factor function is shown in FIG. 4.

As described above, one or more of the raw sine and/or raw cosine signals is (are) generated by the combination of GMR sensors, supporting magnet and the flywheel. The raw signals are first conditioned in several steps. This is necessary, since the trigonometric function properties of the sine and the cosine signal are given and must be identical for an exact interpolation. Signal processing particularly includes the following stages for this purpose: namely amplification, offset correction, phase correction, noise attenuation, and/or signal control.

In the amplifier stage, the amplitudes of the raw signals are amplified to a magnitude that can be processed for the interpolator. Due to the mechanical and physical tolerances, the sinusoidal signals with an equal component (offset) are affected. These "offsets" are compensated via digital potentiometers. This is carried out in the circuit either prior to the amplification or at the inputs of the interpolator (available circuits). The offset compensation is conducted automatically by pushing a button when circuits are available via a special mode of the interpolator in connection with a period duration measurement of the microcontroller µC.

The further stages are taken over in the available circuits of the development by means of functions within the interpolator. However, these can also be provided by means of other hardware assemblies.

The 90° offset, which is also necessary for the correct interpolation, is produced by the phase offset correction. Noise effects superimposed on the sinusoidal signals are then attenuated via low-pass filters.

The signal control assures a certain tolerance range for offset and amplitude fluctuations of the sin/cos signal. Here ADCs are utilized in turn.

In the invention, an amplification and offset control is found internally in the interpolator. Then the signals are digitized with high resolution by the above-described interpolation methods.

The further processing of the ABZ pulse signals is conducted by the corresponding process computer (here a microcontroller). The microcontroller takes over the control and evaluation unit of the system.

Due to the capability of the quadrature encoder inputs to count edges and to very rapidly detect changes in direction, the pulse filtering to be patented can be conducted prior to the final output via the output stage.

The user has the possibility to execute the corresponding adjustments with the coding switches: interpolation factor, degree of filtering, preferred direction, structural size, automatic offset compensation, as well as other features.

Figure 5:
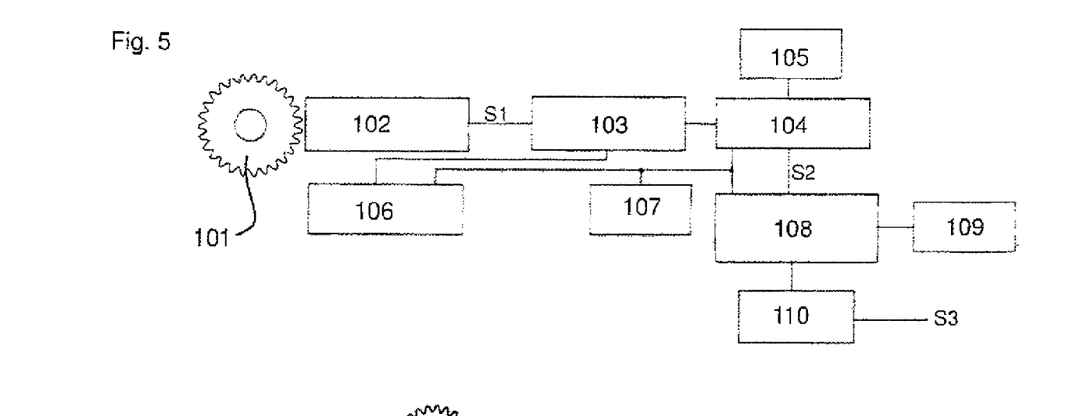
FIG. 5 an exemplary circuit for the pulse filtering and for the interpolation factor function and FIG. 6 an exemplary circuit for the pulse value fitting.

FIG. 5 shows an exemplary circuit for the pulse filtering and for the interpolation factor function.

In this representation, the individual components of the circuit for pulse filtering and interpolation factor function are shown in more detail.

Figure 6:
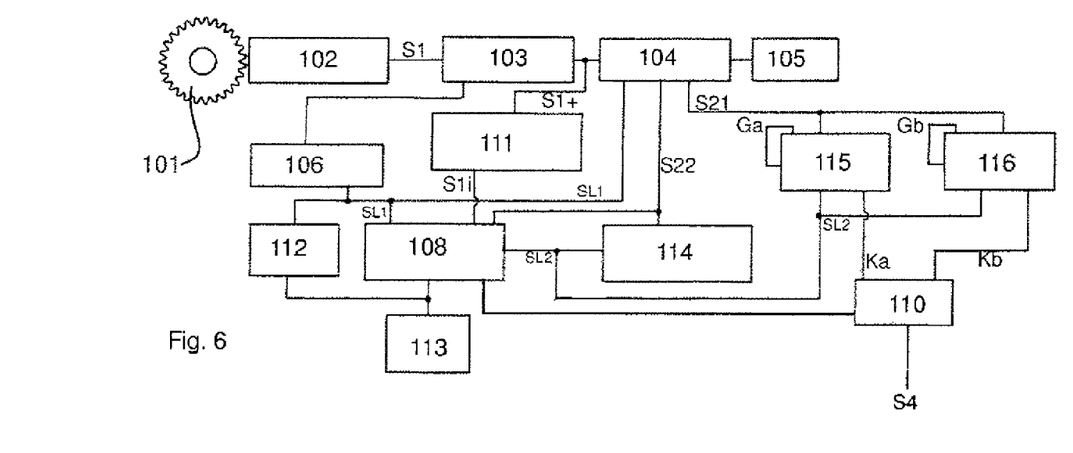

FIG. 6 shows an exemplary circuit for the pulse value fitting.

The signal generation, signal conditioning and signal interpolation are identical to a circuit for the pulse filtering and/or the interpolation factor function.

The conditioned signal is digitized, among other things, via a Schmit trigger circuit. These output pulses have the normal 1-fold resolution, i.e., one pulse per tooth. These A/B pulses are used via a quadrature encoder interface of the process computer for the pulse filtering, so that interference due to system oscillations is not incorporated in the process of value fitting.

In this case, the outputs are "blocked". The Z signal of the interpolator also reflects the simplified frequency. This is continuously measured via the 32-bit counter with the period duration measurement method. The measurement value is evaluated by the process computer (here the DSP controller) and the corresponding support points of the respective deviation region are retrieved from the look-up table. The look-up table contains proportional counter values for the deviations from the calibration protocol of the volume meter.

With these values and via an approximation calculation, or via corresponding algorithms in the process computer (here also called interpolation), the limit values (counter values) for the pulse value correction are determined for both quadrature encoder counters and sent to them.

The highly resolved NB signals of the interpolator are continually determined and counted by the quadrature encoder counters. For each limit-value detection, the counters transmit a signal to the output circuit and are automatically reset by a feedback. The channels of the output stage change for each signal of the quadrature encoder counters, so that a quadrature encoder signal A/B is formed with a period length dependent on the limit values or the approximation calculation. The value of the pulse is fitted to the correct level (1-fold resolution).

The embodiment examples shown are not to be viewed as conclusive, but only represent possible embodiment examples of the volume measurement and evaluation method and measurement device according to the invention.

LIST OF REFERENCE CHARACTERS

100 Interpolation unit
101 Flywheel
102 Giant magnetoresistance (GMR) sensor with double measuring bridge
103 Signal processing (amplification and offset compensation)
1031 Phase
1032 Low pass
1033 Signal control (gain+offset)
104 Interpolator
105 First EEPROM
106 Digital potentiometer
107 Second EEPROM
108 Process computer unit with quadrature encoder counter (QEI) [µC]
109 Coding switch
110 Output stage
111 Schmit trigger circuit pulse simplification
112 EEPROM for configuration (Config) and look-up-table (LUT)
113 System clock
114 32-bit counter for period duration measurement
115 ABZ quadrature counter 1
116 ABZ quadrature counter 2
S1 Raw sin/cos signals
S1+ Conditioned sin/cos signals
S1i Pulse signals 1-fold
S2 ABZ signals (pulse signals from interpolation)
S21 Highly resolved AB signal
S22 Z signal
S3 Quadrature signals with pulse filtering
S4 A/B signals with value fitting SL1 Bus 1
SL2 Bus 2
Ga Limit value A
Gb Limit value B
Ka Channel A
Ka1 Channel A with pulse value fitting
Kb Channel B
Kb1 Channel B with pulse value fitting
Imp Imported pulse signals
X Preferred transport direction
−X Opposite to transport direction (back run)
Co Output signal without filtering
Cf Output signal with filtering
Af Activation of the filter function
Df Deactivation of the filter function
IPF1 Interpolation factor 1
IPF2 Interpolation factor 2
IPF3 Interpolation factor 3
Dg Signal output of the control line
Do Signal output without teaching function
Dt Signal output with teaching function
Q Flow quantity (liters/min)
U Voltage
t Time

What is claimed is:

1. A method for measuring a volumetric flow (Q) of a fluid in a preferred direction by a volume measurement device, said volume measurement device comprises an electronic circuit and an incremental encoder; and a sensor for detecting a rotational change of angle, designed as two giant magnetoresistance (GMR) sensors in a double measuring bridge, wherein a first sinusoidal signal of the incremental encoder, namely a raw sine signal, and a second sinusoidal signal of the incremental encoder having identical angular frequency $\omega$ which is phase-shifted by 90° relative to the first sinusoidal signal, namely a raw cosine signal, first conditioned (S1+), and then interpolated/digitized (S2), and these interpolated/digitized signals (S2) are processed and evaluated in an evaluation unit or a process computer unit having a quadrature encoder counter, said the method comprising the steps of:
   a) Detecting the flow of the fluid;
   b) Determining the direction of flow of the fluid;
   c) Determining the state of flow of the fluid: flowing in the preferred direction, shivering and/or oscillating; and
   d) Further conducting the interpolated/digitized signals (S2) as a function of the state of the fluid to an output stage in the form of a quadrature signal with pulse filtering (S3), namely:
      (i) In the case of flowing in the preferred direction: further conducting the original interpolated/digitized signal (S2); and
      (ii) In the case of shivering and/or oscillating: changing the interpolated/digitized signal (S2) to a base signal (no movement of the fluid) and further conducting the modified digital signal, which signals no flow (base signal).

2. The method according to claim 1, further characterized in that the digital signals include a first digital signal and a second digital signal, and in that the determination of the state of the fluid is produced by comparing the time change of the first and/or the second digital signal, namely:
   State of flow in the preferred direction is present when, starting from a null position of the volume measurement device, the first signal is changed before the second signal (edge change), and a periodic change with this phase shift occurs;
   State of shivering is present when the first signal is constant and the second signal changes, and
   State of oscillation is present when, starting from a null position of the volume measurement device, the second signal is changed before the first signal, and a periodic change with this phase shift occurs (backward oscillation), and subsequently (end of the backward oscillation), starting from a null position of the volume measurement device, the first signal is changed before the second signal and a periodic change with this phase shift occurs (forward oscillation).

3. The method according to claim 1, further characterized in that after determining the state of oscillation or shivering, first the volume of fluid that is transported during the oscillation or the shivering counter to the preferred direction is equilibrated with the volume of fluid that is transported in the preferred direction (equilibration of counted pulses), before determining the state of flow again in the preferred direction.

4. The method according to claim 1, further characterized in that for the measurement/detection and/or state determination, the edge changes of the digital signals are counted and/or processed in the evaluation unit, of the process computer unit having the quadrature encoder counter, particularly in an internal counter.

5. The method according to claim 1, further characterized in that the digital signals are masked and output on another output, these digital signals being signaled completely only starting from when they exceed a limit value.

6. A method for measuring a volumetric flow by a volume measurement device, said volume measurement device comprises an electronic circuit and an interpolation factor (IPF1, IPF2, IPF3) that is used for the resolution of the flow quantity (Q) of the fluid to be determined being fitted as a function of the volumetric flow (Q); wherein a first signal of a first sensor and a second signal of a second sensor having identical angular frequency $\omega$, which are phase-shifted by 90° relative to one another, and wherein a quadrature signal serves to determine the through-flow (Q) of a fluid in a preferred direction, said method comprising the steps of:
   a) Providing said first and second signals as respective first and second interpolated/digitized signals (S2);
   b) Detecting the flow of the fluid;
   c) Determining the direction of flow of the fluid;
   d) Determining the state of flow of the fluid: flowing in the preferred direction, shivering and/or oscillating; and
   e) Further conducting the interpolated/digitized signals (S2) as a function of the state of the fluid to an output stage in the form of the quadrature signal, namely:
      (i) In the case of flowing in the preferred direction: further conducting the original interpolated/digitized signal (S2); and
      (ii) In the case of shivering and/or oscillating: changing the interpolated/digitized signal (S2) to a base signal (no movement of the fluid) and further conducting the modified digital signal, which signals no flow (base signal).

7. The method according to claim 6, further characterized in that the set and/or used interpolation factor (IPF1, IPF2, IPF3) is separately communicated, whereby the different interpolation factors (IPF1, IPF2, IPF3) are preferably signaled via different voltage levels.

8. A method for measuring a volumetric flow by a volume measurement device, said volume measurement device comprises an electronic circuit; wherein a pulse value fitting (S4) of quadrature signals occurs prior to further conduction to the output unit; wherein a first signal of a first sensor and a second signal of a second sensor having identical angular frequency ω, which are phase-shifted by 90° relative to one another, and wherein the quadrature signals serve to determine the through-flow (Q) of a fluid in a preferred direction, said method comprising the steps of:

a) Providing said first and second signals as respective first and second interpolated/digitized signals (S2);
b) Detecting the flow of the fluid;
c) Determining the direction of flow of the fluid;
d) Determining the state of flow of the fluid: flowing in the preferred direction, shivering and/or oscillating; and
e) Further conducting the interpolated/digitized signals (S2) as a function of the state of the fluid to an output stage in the form of the quadrature signal, namely:
  (i) In the case of flowing in the preferred direction: further conducting the original interpolated/digitized signal (S2); and
  (ii) In the case of shivering and/or oscillating: changing the interpolated/digitized signal (S2) to a base signal (no movement of the fluid) and further conducting the modified digital signal, which signals no flow (base signal).

9. The method according to claim 8, further characterized in that for the pulse value fitting to a database with predefined process values, preferably a look-up table is accessed, and the correction values for the process conditions present at this time are read out and a correction of the quadrature signals is carried out by the correction values.

10. A method for measuring a volumetric flow (Q) of a fluid in a preferred direction by a volume measurement device, said volume measurement device comprises an electronic circuit and an incremental encoder; wherein a first sinusoidal signal of the incremental encoder, namely a raw sine signal, and a second sinusoidal signal of the incremental encoder having identical angular frequency ω which is phase-shifted by 90° relative to the first sinusoidal signal, namely a raw cosine signal, first conditioned (S1+), and then interpolated/digitized (S2), and these interpolated/digitized signals (S2) are processed and evaluated in an evaluation unit or a process computer unit having a quadrature encoder counter, said the method comprising the steps of:

a) Detecting the flow of the fluid;
b) Determining the direction of flow of the fluid;
c) Determining the state of flow of the fluid: flowing in the preferred direction, shivering and/or oscillating; and
d) Further conducting the interpolated/digitized signals (S2) as a function of the state of the fluid to an output stage in the form of a quadrature signal with pulse filtering (S3), namely:
  (i) In the case of flowing in the preferred direction: further conducting the original interpolated/digitized signal (S2); and
  (ii) In the case of shivering and/or oscillating: changing the interpolated/digitized signal (S2) to a base signal (no movement of the fluid) and further conducting the modified digital signal, which signals no flow (base signal).

11. The method according to claim 10 wherein the changed digital signal represents no flow.

12. The method according to claim 10 wherein the processed and evaluated digital signals in the evaluation unit are controlled by a process computer unit having a quadrature encoder counter.

13. The method according to claim 10 including providing a sensor for detecting a rotational change of angle, designed as two giant magnetoresistance (GMR) sensors in a double measuring bridge.

14. The method according to claim 10, further characterized in that the digital signals include a first digital signal and a second digital signal, and in that the determination of the state of the fluid is produced by comparing the time change of the first and/or the second digital signal, namely:
State of flow in the preferred direction is present when, starting from a null position of the volume measurement device, the first signal is changed before the second signal, and a periodic change with this phase shift occurs;
State of shivering is present when the first signal is constant and the second signal changes.

15. The method according to claim 13 wherein the state of oscillation is present when, starting from a null position of the volume measurement device, the second signal is changed before the first signal, and a periodic change with this phase shift occurs, and subsequently, starting from a null position of the volume measurement device, the first signal is changed before the second signal and a periodic change with this phase shift occurs.

16. The method according to claim 10, further characterized in that after determining the state of oscillation or shivering, first the volume of fluid that is transported during the oscillation or the shivering counter to the preferred direction is equilibrated with the volume of fluid that is transported in the preferred direction, before determining the state of flow again in the preferred direction.

17. The method according to claim 10, further characterized in that for the measurement/detection and/or state determination, the edge changes of the digital signals are counted and/or processed in the evaluation unit, of the process computer unit having the quadrature encoder counter, particularly in an internal counter.

18. The method according to claim 10, further characterized in that the digital signals are masked and output on another output, these digital signals being signaled completely only starting from when they exceed a limit value.

* * * * *